No. 882,315. PATENTED MAR. 17, 1908.
J. A. HOLFELDER.
CONNECTION FOR RADIATOR WALL SECTIONS.
APPLICATION FILED NOV. 2, 1907.
2 SHEETS—SHEET 2.
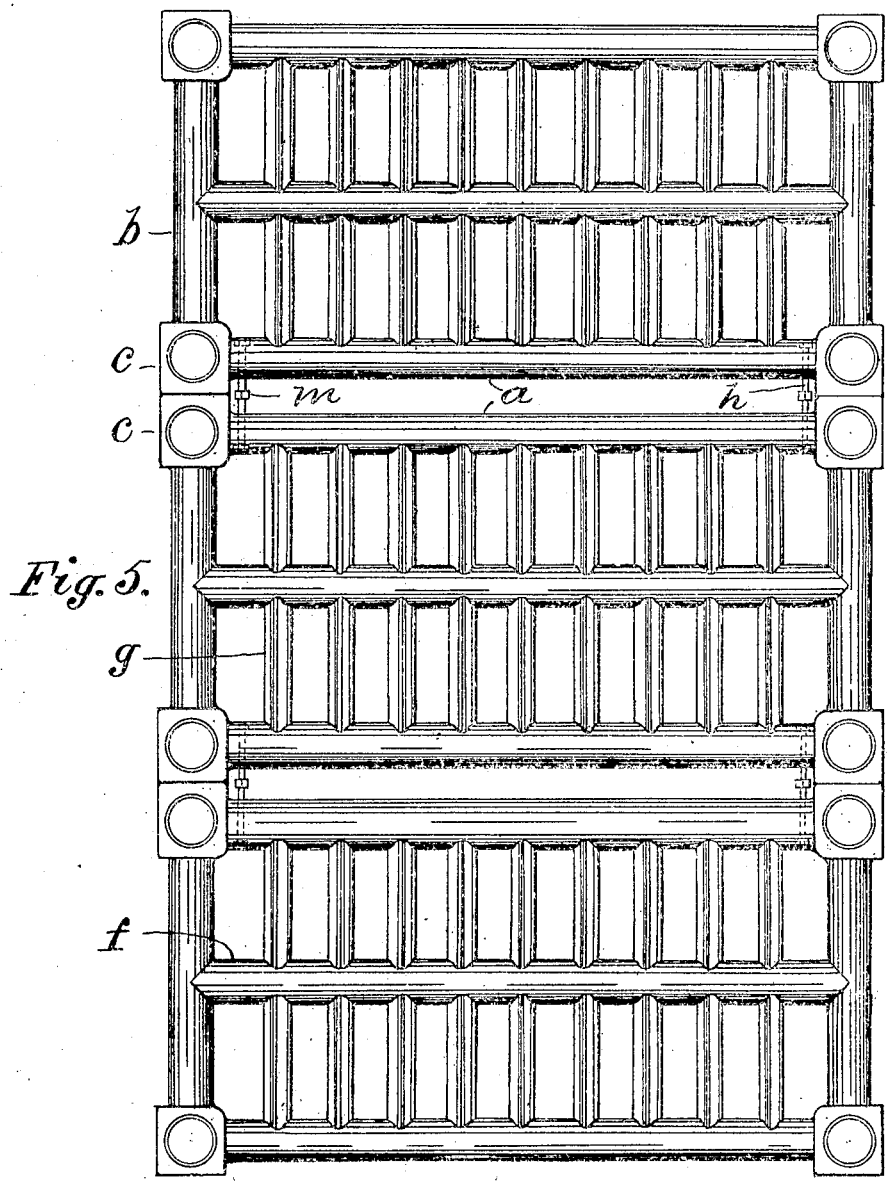
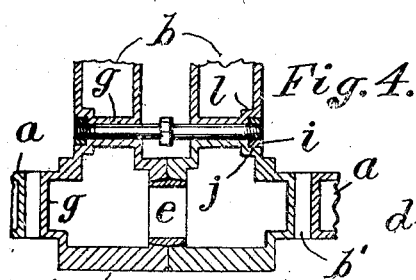
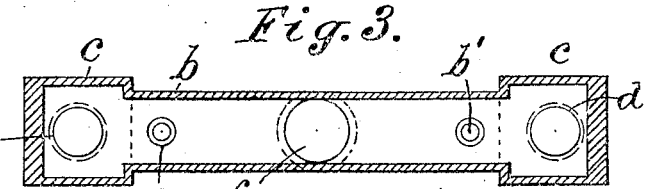

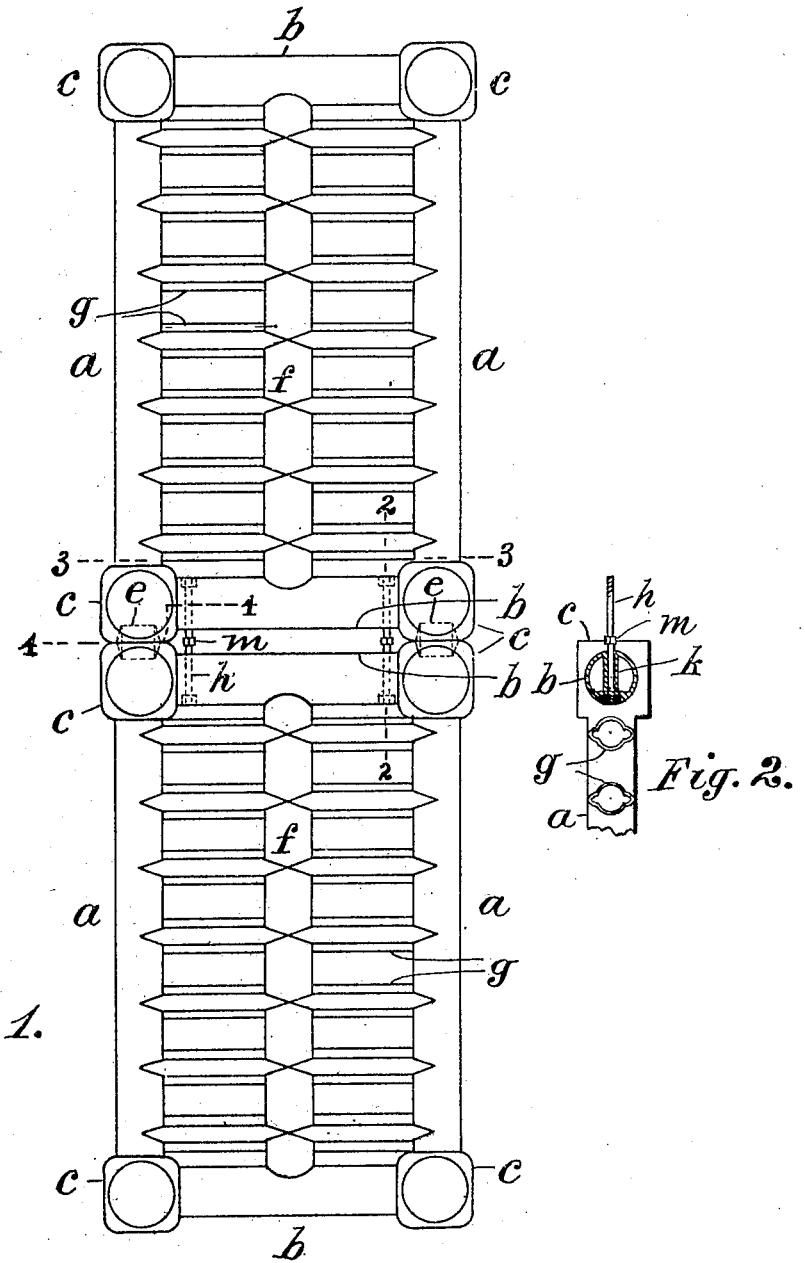

UNITED STATES PATENT OFFICE.

JOHN A. HOLFELDER, OF UNIONTOWN, PENNSYLVANIA, ASSIGNOR TO McCRUM-HOWELL COMPANY, OF NORWICH, CONNECTICUT, A CORPORATION OF CONNECTICUT.

CONNECTION FOR RADIATOR WALL-SECTIONS.

No. 882,315.

Specification of Letters Patent.

Patented March 17, 1908.

Application filed November 2, 1907. Serial No. 400,427.

*To all whom it may concern:*

Be it known that I, JOHN A. HOLFELDER, a citizen of the United States, residing at Uniontown, Fayette county, and State of Pennsylvania, have invented certain new and useful Improvements in Connections for Radiator Wall-Sections, fully described and represented in the following specification and the accompanying drawings, forming a part of the same.

The present invention relates to an improvement in a cast iron wall radiator section of rectangular form having marginal tubes with heads at the corners, upon the outer sides of which are two seats, in either of which a socket may be formed to receive a connecting nipple. Such wall sections are made of greater length than width, to adapt them for use in various positions, and are, in practice, sometimes connected by their shorter sides and sometimes by their longer sides; requiring the connecting nipples to be set upon the contiguous sides, and the bolts extended through the tubes upon such contiguous sides for clamping the nipples in their sockets.

In the present invention, I form each of the marginal tubes adjacent to the corners with an integral sleeve formed therethrough, whereby the long or short sides of the sections may be placed in contiguity, and a bolt extended through such tubular sleeves and secured by nuts upon the inner sides of the marginal tubes, to clamp the sections together.

The inner ends of the tubular sleeves are preferably recessed, and loose nuts fitted in such recesses flush with the inner sides of the tubes, whereby the nuts are wholly concealed, and the bolts serve to connect the sections without exposing visibly the means of connection.

The invention will be understood by reference to the annexed drawing, in which

Figure 1 is a side elevation of two sections having their ends coupled together; Fig. 2 is a section of the part adjacent to the joint, taken on line 2—2 in Fig. 1, with the connecting-bolt. Fig. 3 is a cross section on line 3—3 in Fig. 1; Fig. 4 is a section on line 4—4 in Fig. 1; Fig. 5 is a side elevation of three sections having their sides coupled together.

Each radiator section is shown of oblong rectangular form, made of cast iron in one piece, with four marginal tubes, two side-tubes $a$, $a$, and two end-tubes $b$, $b$. These marginal tubes are united at their corners by enlarged heads $c$, the tubes being joined to the two inner sides of the heads, and the two outer sides of the heads forming seats, in either of which a tapering socket $d$ may be made to receive a push-nipple $e$. Such sockets are formed in the seats as will enable the sections to be connected in the desired relation, whether by their long or short sides; the other seat $c'$ upon each head remaining unperforated, as shown in Fig. 4.

The tubes $b$ are shown connected by a tube $f$ intermediate to the tubes $a$, and the tubes $a$ and $f$ are connected by numerous tubes $g$ intermediate to the tubes $b$, but having free intercommunication, as is common in such wall sections. The tubes $g$ are shown of different shapes in Figs. 1 and 5.

Fig. 1 shows the ends of two sections conjoined by the push-nipples and by means of bolts $h$ which are extended through passages $b'$ transverse to the tubes $b$, and engaged with nuts $i$ which are sunk in recesses $j$ formed upon the inner sides of the tubes.

Sleeves $k$ are cast in both of the marginal tubes adjacent to the corner heads to form the passages $b'$ where the bolts pass through the tubes, to prevent the leakage of heating fluid, and the wall of the tube upon its inner side is formed with a block or thickening piece $l$ in which the recess $j$ for the nut is formed. The bolt is formed with right and left hand threads upon its opposite ends, and with a hexagonal collar $m$ at the center which lies between the adjacent pipes $b$ upon the two sections, where an open wrench can be applied to turn the bolt, and the turning of such collar rotates the bolt in both of the nuts simultaneously and thus clamps the sections firmly together, and makes a tight joint with the nipple $e$ in the sockets $d$.

By recessing the nuts upon the inner sides of the tubes $b$, the disfigurement of the section is prevented, and the means of connecting the several sections together is almost wholly concealed, as the collar $m$ and central portion of the bolt are the only parts of the fastening exposed to view.

By forming the sleeves $g$ in the tubes $a$ as well as in the tubes $b$, as shown in Fig. 4, the sections are adapted to be coupled together by the ends, as shown in Fig. 1, or by the sides, as shown in Fig. 5, the sockets for the push-nipples e being made in the corners upon the sides or ends, as may be required; and the metal in the outer side of each head being made of sufficient thickness, is shown at c' in Fig. 4, to form the tapering socket when bored therein. The sections may thus be carried in stock with the sleeves extended through the side and end-tubes adjacent to the heads c, and then fitted up at very short notice for coupling together by either the sides or ends, by boring the holes required for the tapering sockets d, where required.

Having thus set forth the nature of the invention what is claimed herein is:

1. A radiator wall section of rectangular form having four side-tubes and heads upon the corners with seats for sockets upon the two outer sides of the head, one seat upon each corner having a nipple-socket therein, and integral sleeves extended through the radiator-tubes upon all the four sides adjacent to the corners, adapting either the long or short sides of such sections to be placed in contiguity to form a wall radiator.

2. In a wall radiator, sections of rectangular form having the marginal tubes a and b united by heads c at the corners, seats for outwardly flared sockets upon the outer sides of the heads with sockets formed in the adjacent seats, push-nipples fitted in the said sockets, the longitudinal tubes f between the tubes a, the plurality of tubes g connecting the tubes a and f, and each of the marginal tubes having adjacent to the corners the integral sleeve k formed therethrough, whereby the long or short sides of the sections may be placed in contiguity and a bolt h extended through the tubular sleeves and secured by nuts upon the inner sides of the marginal tubes, to clamp the push-nipples in their sockets.

3. In a wall radiator, sections of rectangular form having the marginal tubes a and b united by heads c at the corners with sockets for fluid connections upon the contiguous sides of the heads, nipples fitted to such sockets, the longitudinal tube f between the tubes a and the plurality of tubes g connecting the tubes a and f, and the marginal tubes having adjacent to the corners the integral sleeves k formed therethrough and the sleeves formed upon the inner sides of said marginal tubes with the recesses j, loose nuts i fitted therein flush with the surface of the tubes, and the bolt h reversely threaded at opposite ends and fitted to the nuts, to clamp the nipples in their sockets.

In testimony whereof I have hereunto set my hand in the presence of two subscribing witnesses, on September 6th 1907.

JOHN A. HOLFELDER.

Witnesses:
W. M. MACKAY,
J. W. CURTIS.